US010325251B2

(12) United States Patent
Unser et al.

(10) Patent No.: US 10,325,251 B2
(45) Date of Patent: Jun. 18, 2019

(54) APPARATUS, METHOD, AND COMPUTER PROGRAM PRODUCT FOR SECURE, PRIVACY-AWARE QUALIFIED EXPENDITURE TRACKING IN AN ISO 8583 NETWORK OR THE LIKE

(71) Applicant: MasterCard International Incorporated, Purchase, NY (US)

(72) Inventors: Kenny Unser, Fairfield, CT (US); Jean-Pierre Gerard, Croton On Hudson, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 615 days.

(21) Appl. No.: 14/920,274

(22) Filed: Oct. 22, 2015

(65) Prior Publication Data

US 2017/0116605 A1    Apr. 27, 2017

(51) Int. Cl.
*G06Q 20/20* (2012.01)
*G06Q 20/40* (2012.01)
*G06Q 20/02* (2012.01)

(52) U.S. Cl.
CPC ......... *G06Q 20/204* (2013.01); *G06Q 20/023* (2013.01); *G06Q 20/209* (2013.01); *G06Q 20/405* (2013.01)

(58) Field of Classification Search
CPC .. G06Q 20/204; G06Q 20/023; G06Q 20/209; G06Q 20/405
USPC .......................................................... 705/17
See application file for complete search history.

(56) References Cited

U.S. PATENT DOCUMENTS

| 6,636,833 | B1 | 10/2003 | Flitcroft |
| 7,136,835 | B1 | 11/2006 | Flitcroft |
| 7,628,319 | B2 | 12/2009 | Brown |
| 7,783,501 | B2 | 8/2010 | Slen |
| 7,912,734 | B2 | 3/2011 | Kil |
| 8,099,303 | B1 | 1/2012 | Battaglia |
| 8,392,208 | B1 | 3/2013 | Klieman |
| 8,751,250 | B2 | 6/2014 | Lutzen |
| 2006/0149595 | A1 | 7/2006 | Williams |
| 2006/0149670 | A1 | 7/2006 | Nguyen |
| 2007/0219828 | A1 | 9/2007 | Schlicher |
| 2007/0276695 | A1 | 11/2007 | Lieberman |

(Continued)

*Primary Examiner* — A. Hunter Wilder
*Assistant Examiner* — Joseph M Mutschler
(74) *Attorney, Agent, or Firm* — Otterstedt, Ellenbogen & Kammer, LLP

(57) ABSTRACT

At an intermediate node in a payment card processing network, clearing records are obtained for payment card transactions with a merchant which sells eligible wares and ineligible wares. Said clearing records specify, for each of said transactions, a total transaction amount and information representative of an amount associated with said eligible wares. At least a portion of said clearing records are stored in a first database accessible to said intermediate node in said payment card processing network, by transaction. Said first database is queried on payment card account number and, for said payment card account number, at least said information representative of an amount associated with said eligible wares is collected. Said collected information representative of an amount associated with said eligible wares is made available to at least one interested party.

12 Claims, 9 Drawing Sheets

(56) References Cited

U.S. PATENT DOCUMENTS

| | | |
|---|---|---|
| 2009/0063197 A1 | 3/2009 | Lisle |
| 2009/0083069 A1 | 3/2009 | Tierney |
| 2009/0112721 A1* | 4/2009 | Hammad ............. G06Q 10/087 705/14.14 |
| 2009/0177488 A1 | 7/2009 | Unland |
| 2010/0088207 A1 | 4/2010 | McLaughlin |
| 2010/0174556 A1 | 7/2010 | Wilkins |
| 2010/0332247 A1 | 12/2010 | Spriggs |
| 2011/0015960 A1 | 1/2011 | Martin |
| 2011/0071846 A1 | 3/2011 | Crystal |
| 2013/0117035 A1 | 5/2013 | Tierney |
| 2014/0316798 A1 | 10/2014 | Lutzen |
| 2015/0095205 A1* | 4/2015 | Hebner ................ G06Q 40/123 705/31 |
| 2015/0170127 A1 | 6/2015 | Unser |
| 2017/0200162 A1* | 7/2017 | Pourfallah ......... G06Q 20/3276 |

* cited by examiner

APPARATUS, METHOD, AND COMPUTER PROGRAM PRODUCT FOR SECURE, PRIVACY-AWARE QUALIFIED EXPENDITURE TRACKING IN AN ISO 8583 NETWORK OR THE LIKE

FIELD OF THE DISCLOSURE

The present disclosure relates generally to the electronic and computer arts, and, more particularly, to tracking qualified expenditures made with a payment card account or the like.

BACKGROUND OF THE DISCLOSURE

The use of payment cards, such as credit cards, debit cards, and pre-paid cards, has become ubiquitous. Most payment card accounts have one or more associated physical cards; however, the use of non-traditional payment devices, such as appropriately-configured "smart" cellular telephones, is increasing.

Tax-advantaged financial accounts of various kinds are quite prevalent. One non-limiting example includes a flexible spending account (FSA), also known as a flexible spending arrangement, which allows an employee to set aside a portion of earnings, pre-tax, to pay for qualified expenses such as medical, dependent care, or the like. Another non-limiting example is a health savings account (HSA), which is a tax-advantaged medical savings account available to taxpayers in the United States who are enrolled in a high-deductible health plan (HDHP).

SUMMARY OF THE DISCLOSURE

Principles of the present disclosure provide techniques for qualified expenditure tracking. In one aspect, an exemplary method includes obtaining, at an intermediate node in a payment card processing network, from a merchant which sells eligible wares which are eligible to be paid for with a special account and ineligible wares which are not eligible to be paid for with a special account, clearing records for payment card transactions with said merchant. Said clearing records specify, for each of said transactions, a total transaction amount and information representative of an amount associated with said eligible wares. Further steps include storing at least a portion of said clearing records in a first database accessible to said intermediate node in said payment card processing network, by transaction; querying said first database on payment card account number and collecting, for said payment card account number, at least said information representative of an amount associated with said eligible wares; and making said collected information representative of an amount associated with said eligible wares available to at least one interested party.

Aspects of the disclosure contemplate the method(s) described herein performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of a computer program product including a tangible computer readable recordable storage medium with computer usable program code for performing the method steps indicated stored thereon in a non-transitory manner. Furthermore, one or more embodiments of the disclosure or elements thereof can be implemented in the form of a system (or apparatus) including a memory and at least one processor that is coupled to the memory and operative to perform exemplary method steps. Yet further, in another aspect, one or more embodiments of the disclosure or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the disclosure can provide substantial beneficial technical effects, as will be appreciated by the skilled artisan from the discussion herein. For example, security and privacy challenges arise in the context of an ISO 8583 network utilized to process transactions which are partially eligible for HSA/FSA reimbursement. One or more embodiments address these concerns by linking an opt-in process to a central member parameter system which is extracted to an interface processor at the premises of an acquirer. These and other features and advantages of the present disclosure will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
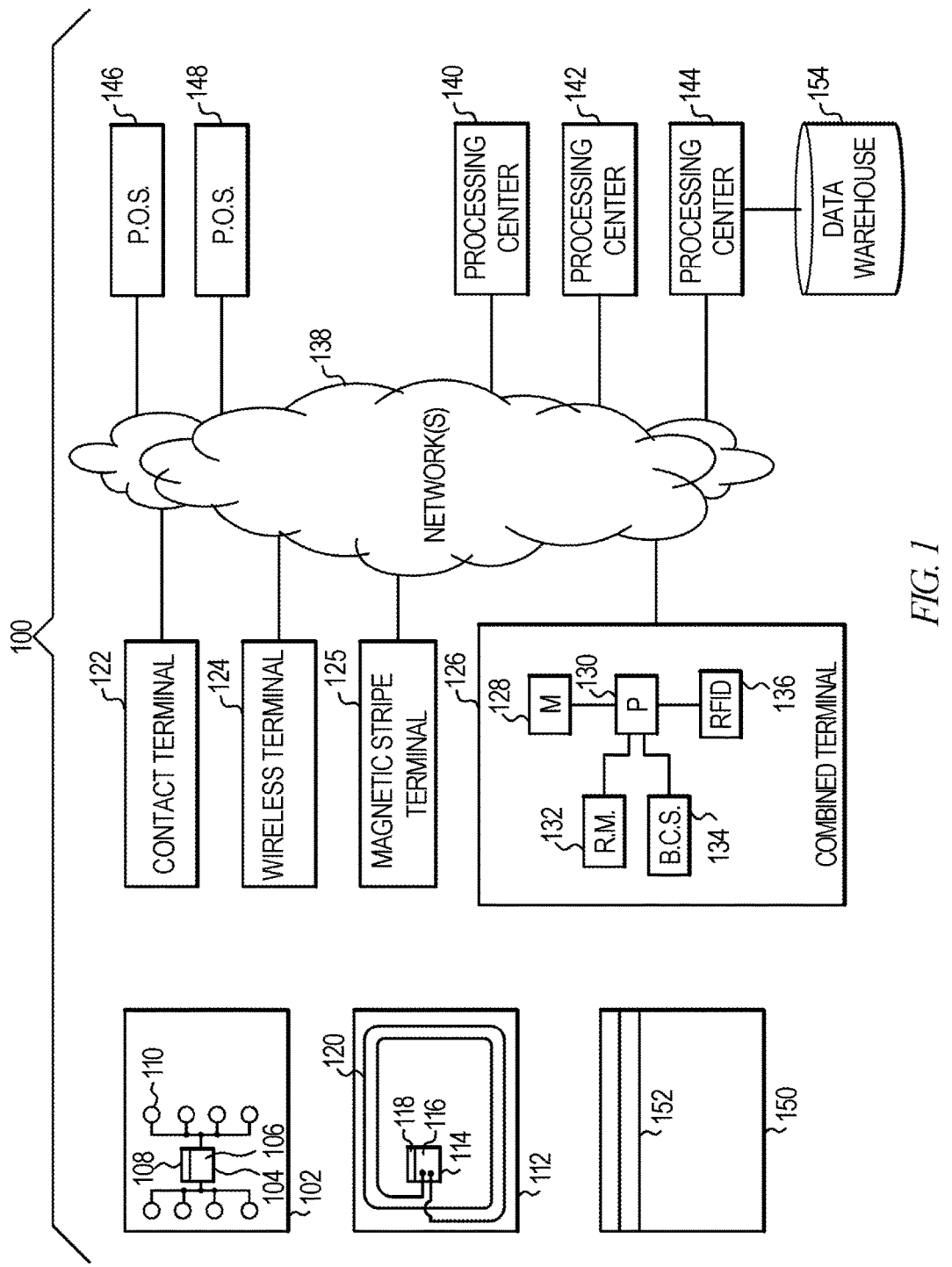
FIG. 1 shows an example of a system and various components thereof that can implement at least a portion of some techniques of the disclosure.

With regard to payment card and similar payments, attention should now be given to FIG. 1, which depicts an exemplary embodiment of a system 100, according to an aspect of the disclosure, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional magnetic stripe device 150, such as a card having a magnetic stripe 152. Furthermore, an appropriately configured mobile device (e.g., "smart" cellular telephone handset, tablet, personal digital assistant (PDA), and the like) can be used to carry out contactless payments in some instances; for example, via near field communications (NFC), wherein the appropriately configured mobile device acts like a contactless card 112 (or, with an electronic wallet present, like multiple such cards).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement some aspects or embodiments of the present disclosure is the MULTOS® operating system licensed by MAOSCO Limited. (MAOSCO Limited, St. Andrews House, The Links, Kelvin Close, Birchwood, Warrington, Wash.3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the MasterCard® PayPass™ specifications, available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be International Organization for Standardization (ISO) 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

The system depicted in FIG. 1 may in general involve not only conventional transactions at "brick and mortar" merchants, but also card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
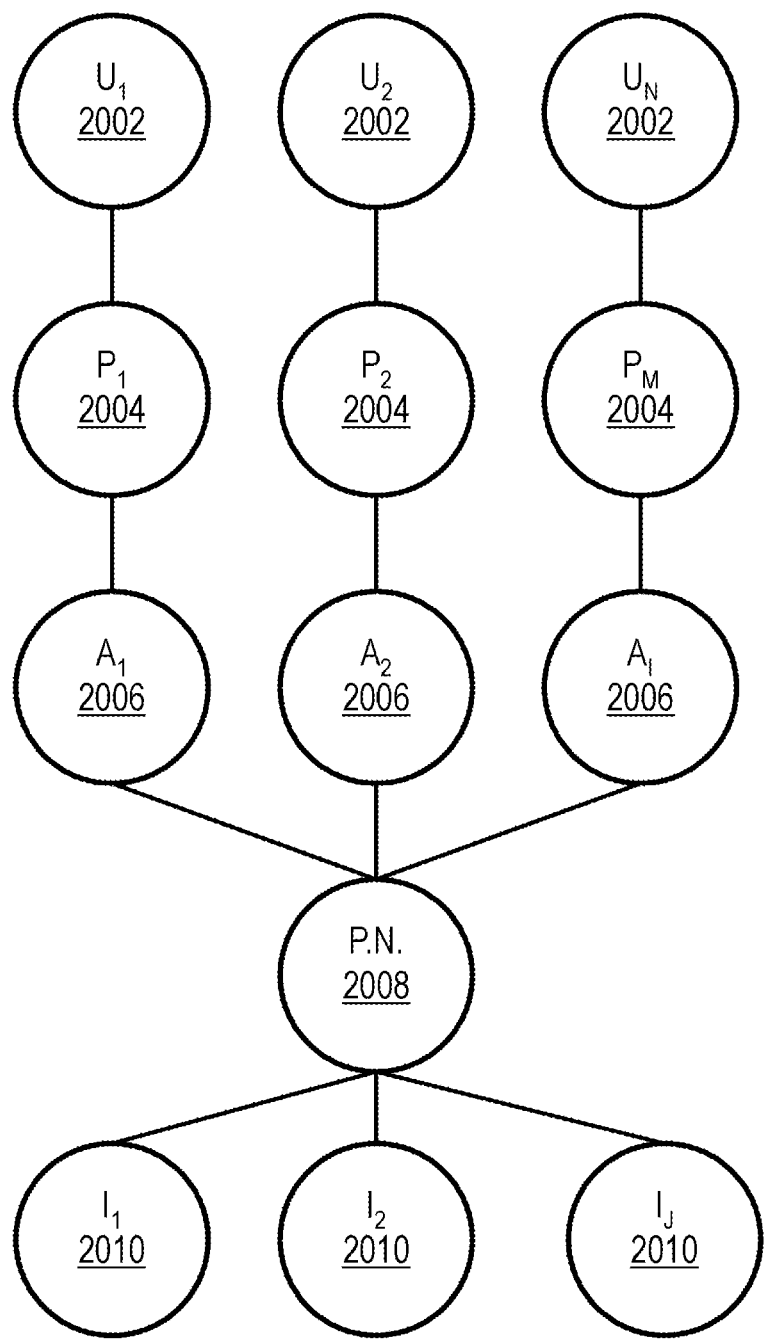
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the disclosure.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note, also, that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type, and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the disclosure may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of payment card transactions such as for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN)(which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. No. 6,636,833 (expressly incorporated herein by reference in its entirety for all purposes) and U.S. Pat. No. 7,136,835 (expressly incorporated herein by reference in its entirety for all purposes) of Flitcroft et al.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. Other non-limiting examples of payment card networks include the AMERICAN EXPRESS® and DISCOVER® networks.

Figure 3:
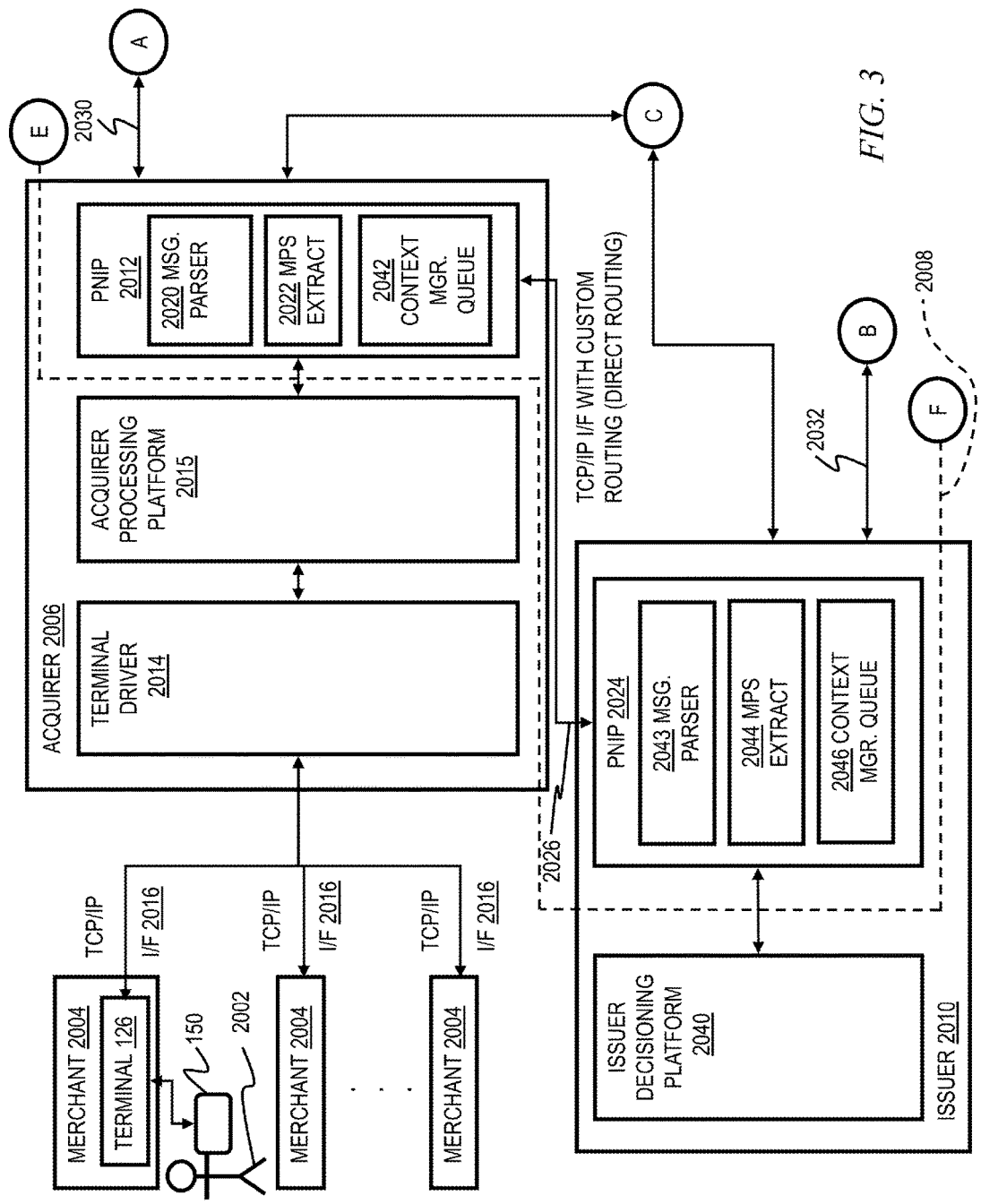
FIGS. 3 and 4 provide an exemplary detailed view of operation of an exemplary payment card network, in accordance with an aspect of the disclosure.
Figure 4:
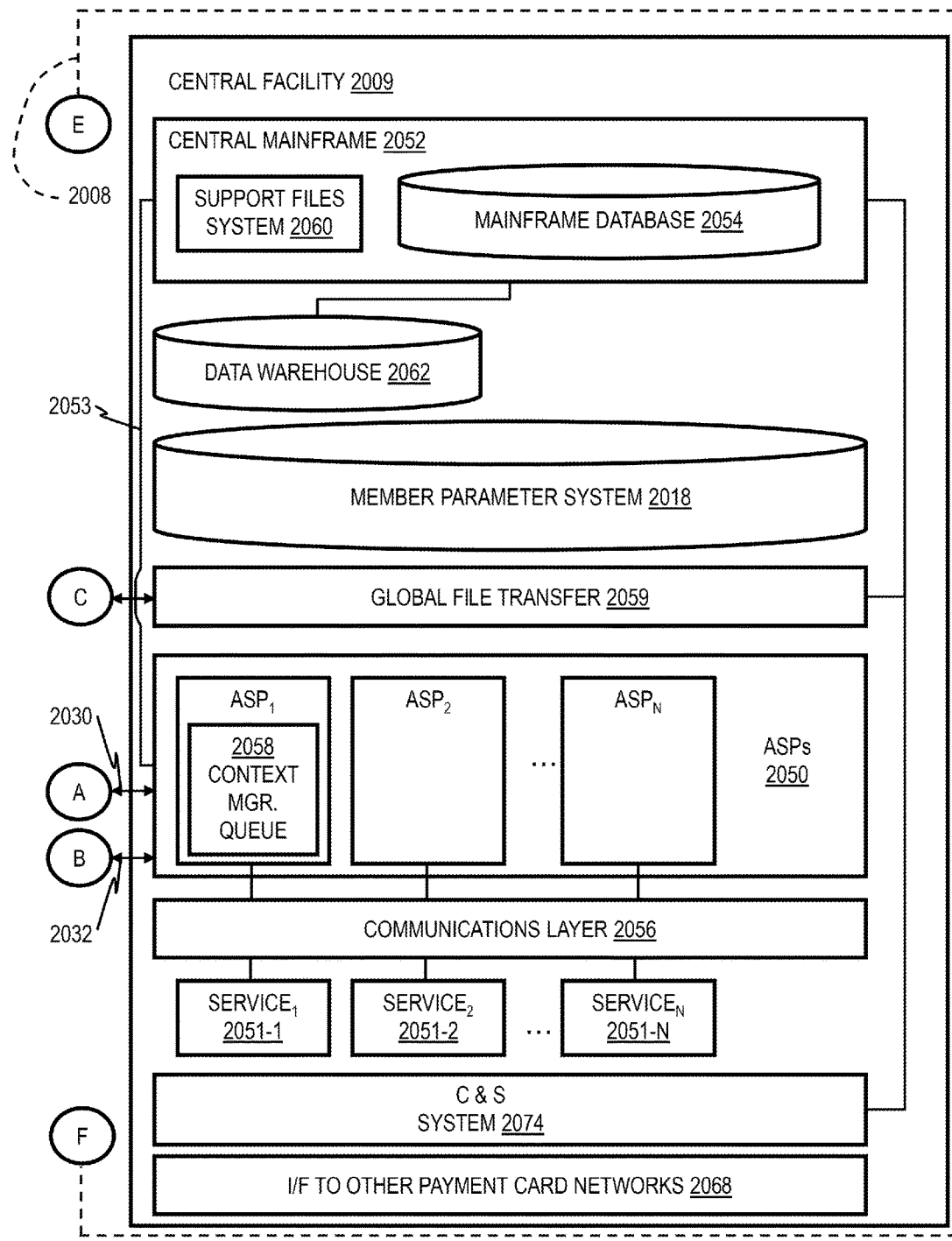

Still referring to FIG. 2, and with reference also now to FIGS. 3 and 4, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 3 and 4 encompasses the network 2008. Note generally that points A, B, C, E, and F in FIG. 3 connect to the corresponding points in FIG. 4; the entire network and associated environment are not amenable to illustration on a single sheet.

The acquirer 2006, in the specific example of FIGS. 3 and 4, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format. The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 configuration and transactions from that account range are then routed to the port from which the sign-in request is received. A member ID can be present on ports on multiple PNIPs at an Issuer site—see discussion of FIGS. 6 and 7 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages Routed Directly to the Issuer PNIP:

In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050, and ASPs 2050 and issuer PNIP 2024 are referred to as a network interface onto the payment card network itself (elements 2050 are discussed below). In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 5:
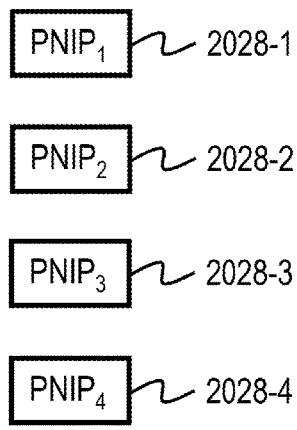
FIG. 5 shows a group of payment network interface processors, such as may be used with the network of FIGS. 3 and 4.
Figure 6:
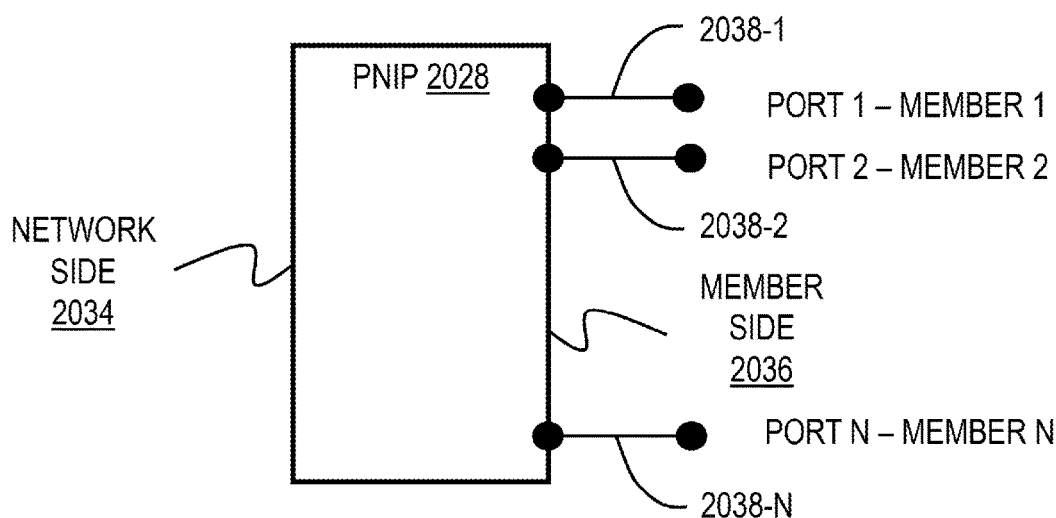
FIG. 6 shows a port arrangement on a payment network interface processor, such as may be used with the network of FIGS. 3 and 4.

FIG. 5 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 5 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 6 where a generalized PNIP 2028 has a network side 2034 and a member side 2036. Member side 2036 has N ports 2038-1 through 2038-N to members 1 to N. N is used herein as a generalized arbitrary integer and the value of N in FIG. 6 is not necessarily the same as that of N in connection with elements 2002 in FIG. 2, for example.

Figure 7:
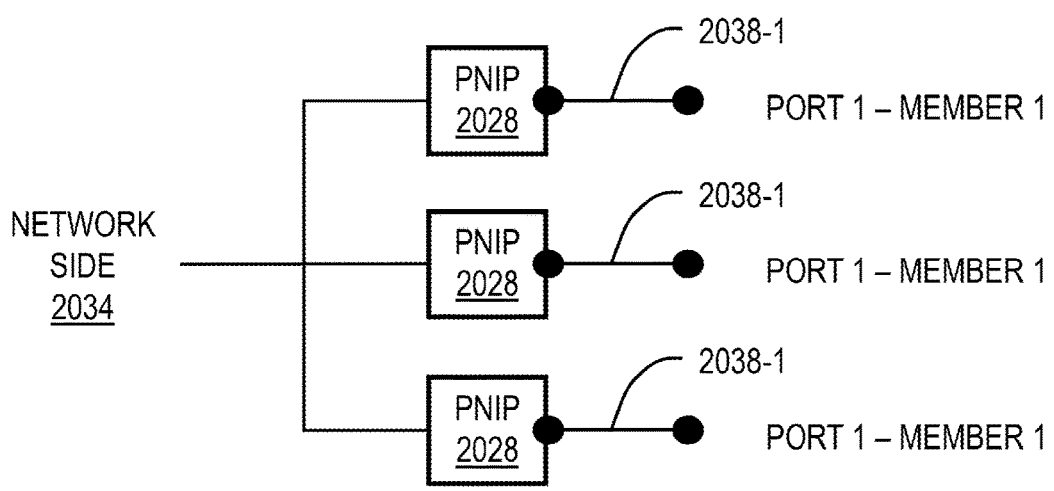
FIG. 7 shows an illustrative case wherein an issuer has multiple payment network interface processors.

As seen in FIG. 7, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 6). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 3 and 4 show "MPS extract" 2022, 2044; this will typically include the extract itself and the associated parameter file manager which manages obtaining the extracts from MPS 2018. Similarly, to reduce clutter, FIGS. 3 and 4 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 3 and 4 to avoid clutter.

Messages in Case of Enhanced Services:

In one or more instances, a special architecture is used to facilitate delivery of enhanced services (the ASP 2050 in FIG. 4 is a non-limiting example). Examples of enhanced services include the MASTERCARD IN CONTROL product providing spending controls and/or virtual card numbers (MASTERCARD IN CONTROL is generally representative of spend control systems, card control systems, and the like, and embodiments indicated as employing MASTERCARD IN CONTROL are not intended to imply any limitation to one particular spend control and/or card control system). Other examples of enhanced services are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, MASTERCARD IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the MASTERCARD IN CONTROL service can be accessed via an instance of an Enterprise Service Bus.

Entry of Data into the Data Warehouse:

In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement:

One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic Aspects:

Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

Tracking Qualified Expenditures with a Payment Processing Network

Cardholders enrolled in Flexible Spending Accounts (FSAs) and/or Healthcare Spending Accounts (HSAs) can pay for certain items using pre-tax funds. Common examples are healthcare related items purchased at a drug store. However, not all items sold at drug stores are eligible for FSA or HSA funds (e.g., gossip magazines and candy bars are ineligible). For this reason, it is common for cardholders to save receipts and later separate and tally the FSA/HSA eligible items for submission to their FSA/HSA administrators.

Embodiments of the disclosure advantageously assist in properly utilizing FSA/HSA funds, by capturing the amount of FSA/HSA items at the time of purchase and passing them to the processor. The processor can then, in various embodiments, deliver this information to the cardholder to assist with tax filings and FSA/HSA filings.

One or more embodiments advantageously modify current transaction processing. In one or more embodiments, the data stream is modified. For example, the data provided to a processor (e.g., an operator of a payment card network such as MasterCard International Incorporated) is modified to receive HSA/FSA information. Data collected may include, by way of example and not limitation, HSA/FSA eligible amount, HSA/FSA eligible item(s), sales tax collected on HSA/FSA eligible items, and the like. This data can be transmitted in multiple ways including, by way of example and not limitation, adding fields to the record layout (e.g. HSA/FSA amount field), repurposing existing fields in the layout, and/or establishing a new data feed (ex. HSA/FSA addendum).

Furthermore, one or more embodiments advantageously modify current point-of-sale (POS) systems. In particular, in one or more embodiments, the payment processing system is modified to interact with the register to capture and transmit HSA/FSA related data in the payments processing data stream.

Yet further, one or more embodiments advantageously modify current data storage approaches by providing a new database, and/or modifying an existing database, to store the HSA/FSA details. For example, existing tables can be modified by adding and/or repurposing elements; a new table can be added to an existing relational database, and/or a new database can be specifically built for HSA/FSA data. In one or more embodiments, the database is populated by the payment processing system, and the data therein is accessible to downstream delivery systems.

In one or more embodiments, after HSA/FSA detail has been captured by the processor at the transaction level, it is aggregated at the individual cardholder and/or account level by a purpose built batch process (software). The cardholder's data is staged in a purpose-built data store. This data store may contain, by way of example and not limitation, dates of reference such as period begin date and period end date; cardholder/account identifier(s); and an HSA/FSA Spend Summary (e.g., total amount and itemized amounts such as merchant level, transaction level, item level, and the like).

Appropriate privacy protections should be implemented in all cases. Some embodiments utilize an opt-in or opt-out process associated with HSA/FSA summary data delivery. Where an opt-in or opt-out process is employed, additional architectural features, including an information collection system and a data store to capture opt-in/opt-out information, can be provided. The information collection system can include, by way of example and not limitation, a web opt-in interface, a call center representative interface, a mail center collection interface, and/or a third party data feed (e.g. opt-in with issuer). The data store to capture opt-in/opt-out information can include, by way of example and not limitation, cardholder/account ID, opt-in/opt-out preference, and/or delivery preference. Non-limiting examples of delivery preferences include e-mail, detail written to statement, year-end statement, data feed to accounting software, on-demand from a website, and the like. In the case of e-mail, additional information can include, by way of example and not limitation, the desired recipient(s) and certain preferences. Recipients could include, for example, a first person such as the cardholder, with a courtesy copy (cc) to an accountant or other third party. Preferences could include, for example, send e-mail for each transaction; send e-mail every certain time period (e.g. monthly); do not send e-mails in the evening, and so on.

In one or more embodiments, the data is compiled and stored in a database accessible by a delivery system. The delivery system has software that accesses the HSA/FSA summary data and any (optional) customer data (e.g. opt-in, delivery preferences, etc.). The delivery mechanism is triggered by the delivery system software and may include, by way of example and not limitation, e-mail; information written to an existing account statement; an additional summary statement (ex. year-end HSA/FSA summary); data feed to accounting software; on-demand reporting from a website; and the like.

Several non-limiting exemplary process flows will now be described. In a first non-limiting example, no cardholder enrollment is required. A merchant, such as a drug store, enrolls in an HSA/FSA itemization program using one or more aspects of the disclosure, in order to differentiate itself from its competition by offering HSA/FSA itemization to its customers. An issuer enrolls in the itemization program in order to differentiate itself from its competition by offering HSA/FSA itemization to its cardholders. The payment card network operator, who provides the HSA/FSA itemization program, works with the drug store to integrate the drug store's register/inventory systems with the drug store's POS terminal so that HSA/FSA information can be transmitted to the payment card network operator with each purchase. The payment card network operator, who provides the HSA/FSA itemization program, also works with the issuer to create an API that the issuer can use to add website features that enable the issuer's cardholders to retrieve HSA/FSA summary reports. In one or more embodiments, the acquirer also works with the merchant, network, and/or issuer; for example, to set up communications with the merchant based on member parameter system extracts, as described elsewhere herein.

A cardholder of an enrolled issuer shops at the drug store, buying a combination of HSA/FSA eligible items and ineligible items. The drug store transmits the HSA/FSA data to the payment card network operator (who provides the HSA/FSA itemization program) with each transaction; the operator receives and stores HSA/FSA data for each transaction, and also aggregates and stores the transaction level HSA/FSA data at the cardholder/account level.

The cardholder visits the website of his or her issuer to review his or her statement. The cardholder's issuer has a link to an HSA/FSA spend summary report. The cardholder clicks the link, and the issuer accesses the operator's HSA/FSA data on that cardholder via an application programming interface (API). The issuer displays an HSA/FSA summary report to the cardholder, who prints the report and uses it to submit a claim to his or her FSA administrator.

In a second non-limiting exemplary process flow, cardholder enrollment is carried out. A merchant, such as a drug store, enrolls in an HSA/FSA itemization program using one or more aspects of the disclosure, in order to differentiate itself from its competition by offering HSA/FSA itemization to its customers. A cardholder enrolls in the HSA/FSA itemization program in order to make the process of accessing HSA/FSA funds easier. The payment card network operator, who provides the HSA/FSA itemization program, stores the enrollment information in a database accessible to the transaction processing system (e.g., BANKNET, VISANET, or the like). The payment card network operator works with the drug store to integrate the drug store's register/inventory systems with the drug store's POS terminal so that HSA/FSA information can be transmitted to the payment card network operator with each purchase.

The enrolled cardholder of an enrolled issuer shops at the drug store, buying a combination of HSA/FSA eligible items and ineligible items. The payment card network operator identifies during authorization that the cardholder and merchant are both enrolled in the HSA/FSA itemization program. For example, the cardholder can be identified by the card number at any point in the process. In one or more embodiments, Merchant ID is also captured—PAN and merchant ID are present in the ISO 8583 auth request and the payment card network can "see" these parameters in the request and recognize it (other embodiments use the member parameter system as described herein). The authorization response contains an indicator that the enrolled merchant should transmit HSA/FSA details in the clearing record transmitted to the payment card network operator (in some cases, the issuer flags the authorization response; other techniques are discussed elsewhere herein). The drug store transmits the HSA/FSA data to the payment card network operator with the enrolled cardholder's transaction. The payment card network operator receives and stores HSA/FSA data for this transaction along with any other transactions for the enrolled cardholder, and aggregates and stores the transaction level HSA/FSA data at the cardholder/account level. The issuer e-mails a periodic (e.g. quarterly) HSA/FSA summary to the cardholder. The cardholder prints the HSA/FSA summary and submits it to his or her HSA/FSA administrator for reimbursement out of his or her pre-tax HSA/FSA funds.

One or more embodiments of the disclosure are useful in a variety of different scenarios. For example, a cardholder may desire to leverage his or her employer's FSA benefit, but he or she may not be very good at keeping track of his or her receipts. He or she may desire a simple way of accounting for his or her eligible purchases so that he or she can access his or her FSA funds. In another example, a cardholder is considering adding funds to his or her FSA to cover eligible purchases at drug stores. The cardholder wants to see how much he or she has spent on eligible items over the previous 12 months as a way of estimating his or her future expenditures. In still another example, a cardholder uses an accountant to manage his or her FSA account. He or she wants his or her accountant to receive an email that details his or her FSA-eligible expenditures on a monthly basis.

In a further example, a drug store wants to differentiate itself from its competitors by offering its customers a way of easily itemizing their HSA/FSA eligible purchases. The drug store enrolls in the HSA/FSA itemization program and advertises its participation to its customers. In yet a further example, an issuer wants to offer a product where cardholders can attach their HSA/FSA accounts to their card accounts, where HSA/FSA eligible expenses trigger automatic withdrawals on their HSA/FSA accounts. When a cardholder receives his or her monthly statement, covered HSA/FSA expenses are already paid and have been subtracted from his or her balance.

Figure 9:
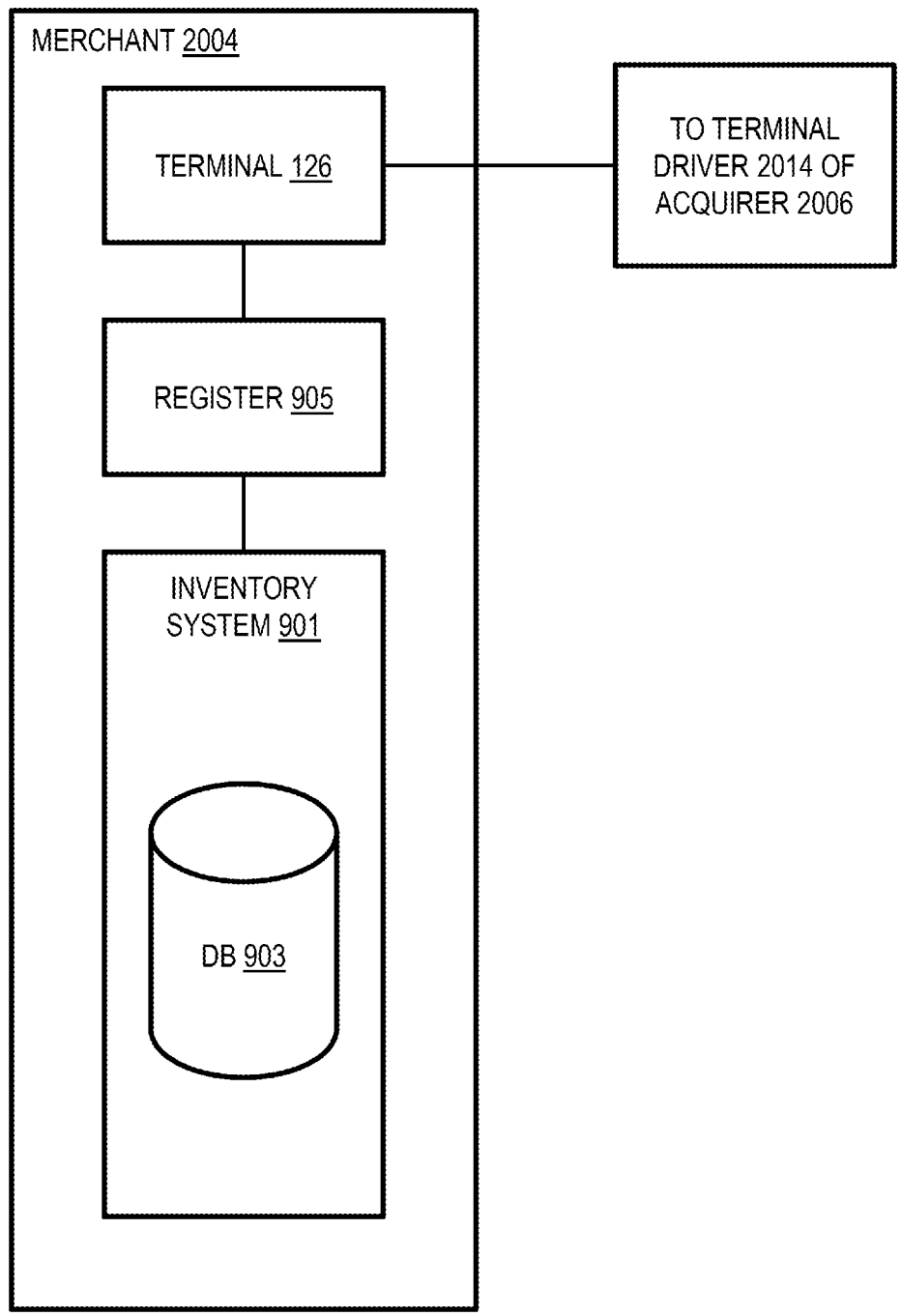
FIG. 9 is a block diagram of a merchant's location, with an inventory system and database containing data for use in connection with one or more embodiments.

One or more embodiments of the disclosure collect and store information regarding itemization at the overall bill level (i.e., receipt level, not item level). That is to say, for a given transaction at a drug store or the like, one or more embodiments collect and store the total transaction amount and the amount eligible for HSA/FSA reimbursement, as opposed to collecting and storing the actual details of what was purchased. By way of further clarification, suppose a person visits a drug store and buys a prescription drug, a box of bandages, a container of over-the-counter cold medicine, a magazine, and a bottle of a soft drink. Suppose that the first three items are reimbursement eligible while the latter two are not. One or more embodiments will collect and store the total price of all five items and the sub-total price of the first three (eligible) items, but not data identifying the actual items purchased (other embodiments could take a different approach). In particular, referring to FIG. 9, as the items are scanned at the register 905, the register (which is associated with terminal 126) communicates with database 903 of inventory system 901 and looks up whether each item is eligible, sums the total purchase price and the total price of eligible items, and determines any other appropriate information (e.g., sales tax). FIG. 9 thus shows a merchant 2004 with an inventory system 901 with database 903 including data on items for sale and whether they are eligible for reimbursement. Inventory system 901 is coupled to one or more registers 905 with associated terminals 126; only one register and terminal are shown for simplicity, it being understood that the merchant may have multiple register(s) and/or terminal(s).

One or more embodiments modify the payment card processing message streams so that the payment card network operator receives details regarding the total bill at the drug store and how much of the bill is for items that qualify for HSA/FSA accounts, such that the HSA/FSA account holder is eligible to receive pretax funds to cover the qualified items. One or more embodiments report the information back to the cardholder, to someone acting on behalf of the cardholder, and/or to a payment card account issuer who is looking to track the amount, study it, and understand, based on the data, what kind of opportunities are afforded. Of course, when handling PII, all applicable data privacy rules should be adhered to, e.g., via opt-in or the like.

A payment card issuer can obtain a service under one or more embodiments which allows the issuer to differentiate itself from competitors. The issuer's cardholders can receive, on their billing statements, the overall amounts they owe and the year to date (or similar period) of HSA/FSA spending. To make this possible for the issuers, in one or more embodiments, the payment card network operator provides a way to transmit this information to the issuers so the issuers can use it in their bill processing. When the issuer prepares a statement, the issuer can retrieve the information from the payment card network operator, either via batch communication or an API. For example, the issuer provides the payment card network operator with a card number and the payment card network operator returns the desired data (e.g., reimbursement-eligible amount). In some instances, when the payment card network operator submits settlement transactions, it modifies the payment stream so that the issuer receives details in some way. If the payment card network operator collects at a transaction level, the payment card network operator can also transmit at a transaction level to the issuer. When the payment card network operator sends a payment to the issuer, during the settlement process, the payment card network operator also transmits details regarding individual transactions. This process can be modified to implement aspects of the disclosure.

Furthermore in this regard, there are several ways of transmitting the information. In one exemplary approach, with some frequency, e.g., daily, weekly, monthly, a file is provided which contains the itemization. In another exemplary approach, an API is provided where the issuer provides the account number or other cardholder information and this allows the payment card network operator to retrieve transaction level or aggregate data and return same to the issuer. In still another exemplary approach, through the settlement process, transaction level information is transmitted, with a breakdown of total amount and HSA/FSA qualified amounts.

Figure 10:
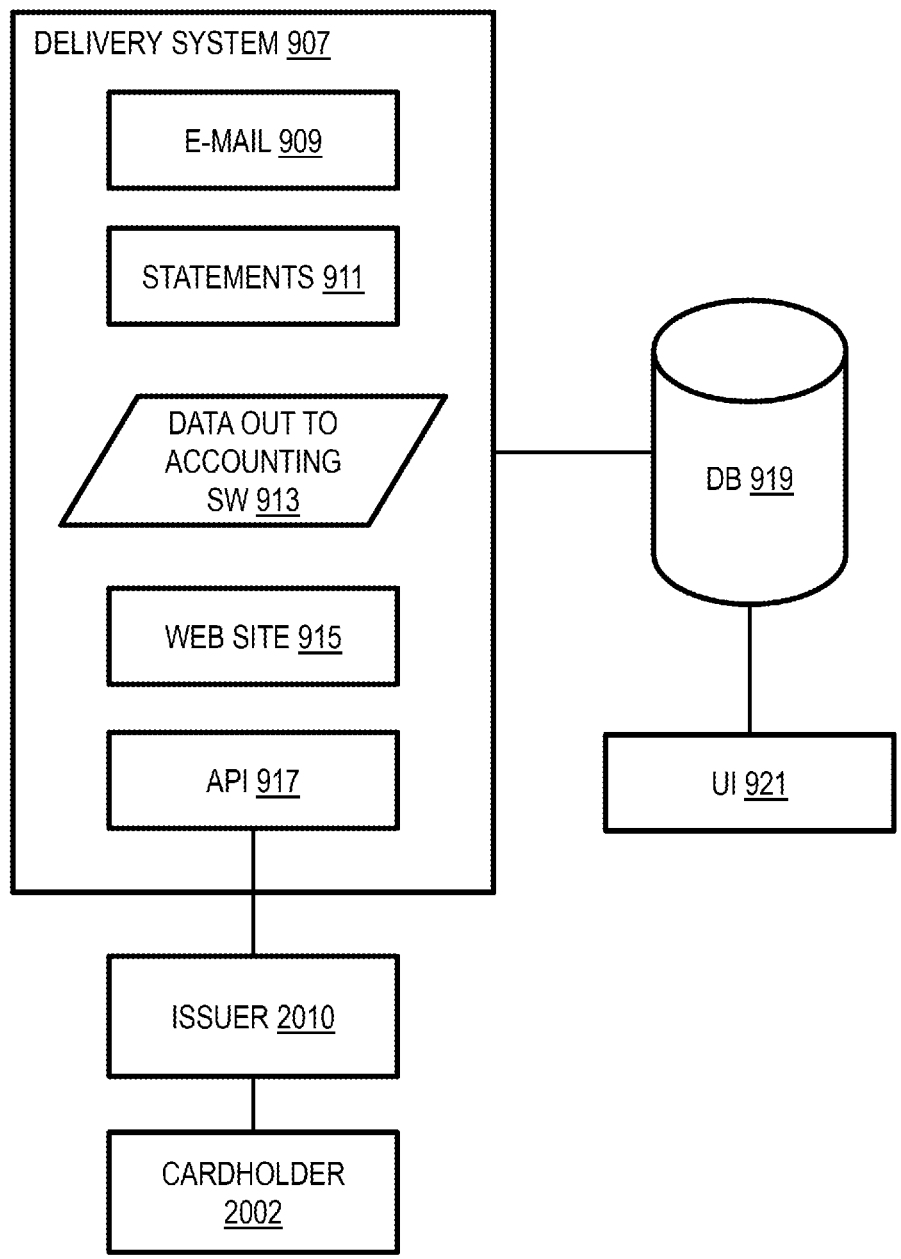
FIG. 10 shows an exemplary system block diagram, in accordance with an aspect of the disclosure.

FIG. 10, discussed below, shows exemplary API calls within the context of an exemplary payment card network environment.

It is worth noting that heretofore, considerable attention has been focused on examining totals and reimbursement-eligible amounts during the payment card authorization process; that is to say, a pre-clearing decision is made on how to fund a transaction, with business-as-usual clearing and settlement. In contrast, in one or more embodiments focus on clearing and settlement aspects. In particular, currently, once the payment card network operator authorizes data and submits a clearing transaction, some of the data is lost. The payment card network operator can backtrack into which account was used, but still just "sees" a "plain" transaction, for a single, total, amount, for whatever account was charged. One or more embodiments record the information, beyond the mere authorization data. In this regard, the authorization system is not really used to do reporting and issuers do not bill out of the authorization system. In one or more embodiments, the payment card network operator is more concerned with clearing data and issuers are concerned with settlement data. For example, if it is desired to carry out an analysis where data is split out by merchant, time period, and the like, one or more embodiments can advantageously facilitate such an analysis by storing information at the transaction level. Currently, there is no room on the transaction layout, or at least no designated area, to transmit the desired information. One or more embodiments re-purpose the clearing transaction to capture the information, store it, and then transmit it.

Some embodiments use a business-as-usual authorization process (i.e., no changes to prior art authorization process) with modifications to clearing and settlement (in other embodiments, discussed above, the payment card network operator identifies during authorization that the cardholder and merchant are both enrolled in the HSA/FSA itemization program, and the authorization response contains an indicator that the enrolled merchant should transmit HSA/FSA details in the clearing record transmitted to the payment card network operator). In an exemplary approach with business as usual authorization, a merchant such as a drug store submits an amount in an authorization request; this is passed over the network to the issuer who responds with an authorization request response indicating that the transaction is approved (or not). Later, when the details come in on the clearing transaction, the itemization is provided (i.e., in addition to total amount, reimbursement-eligible amount).

Thus, one or more embodiments, unlike prior art systems, modify the clearing and settlement processes rather than the authorization process, and maintain and persist additional data beyond current split tender authorizations. One or more embodiments push data out after payment has been made, using a different delivery mechanism, different actions, and at a later time than in the prior art.

FIG. 10 shows an exemplary system block diagram. The components shown in FIG. 10 can be located, for example, at central facility 2009 of the payment card network operator 2008. A new or re-purposed database 919 is accessed by the merchant, issuer, or cardholder, as the case may be, for purposes of providing registration information, including preferences, opt in/opt out information, identifying information, and the like. Database 919 also stores the data on eligible amount totals. Database 919 can be a new database and/or can be implemented by modifying one of the existing databases 2054, 2062, for example. Database 919 can include several different databases if desired (e.g., eligible amount data, merchant registration data, issuer registration data, and cardholder registration data). Database 919 includes persistent storage and a database program and user interface 921. The user interface can be an API to another computer system that acts like a portal, or can be a GUI implemented by serving out hypertext markup language (HTML) from a server to a client's browser, for example.

Delivery system 907 delivers the pertinent information in database 919 to appropriate parties, via, for example, an enterprise e-mail program 909, a component 911 that prepares statements, an interface 913 to accounting software, a website 915 (e.g., providing the GUI discussed just above or a different GUI), or an API 917 that allows issuer 2010 to provide the account number and then returns the corresponding eligible amount data to the issuer 2010, for communication to the cardholder 2002 via the issuer's web site or the like.

Further non-limiting exemplary aspects of data collection and registration will now be presented.

Data Collection:

Currently, there is no space on the record layout that is sent to the payment card network during clearing—the information on the clearing record has no space for to indicate whether an item is HSA/FSA approved. One or more embodiments create a new space or re-purpose an existing field to carry a byte (e.g.) of data. One or more embodiments provide an indicator that an item is eligible for a program (e.g., HSA- or FSA-eligible). One or more embodiments change the existing payment message stream to contain an additional piece of information. Some embodiments include item-level data. However, item-level data is not required, and in one or more embodiments, the merchant certifies whether items are eligible for the program and only a total amount and an eligible amount are provided. Thus, instead of an indicator as to whether a given item is eligible, some embodiments provide an additional field for the eligible amount; e.g. $30 of the $100 purchase is HSA-eligible. Unlike prior art techniques having a total amount and a reimbursement eligible amount in an auth request, one or more embodiments include the total amount and reimbursement eligible amount in the clearing message. Prior techniques sought to leverage the HSA or FSA account to allocate money and thus needed to recognize eligibility before the purchase (during auth) to allocate funds. In contrast, one or more embodiments track expenditures during clearing—prior art systems could not function for their intended purpose of funds allocation if tracking was during clearing rather than auth.

Registration:

There are a variety of possible registration mechanisms. In one aspect, an off-line registration process is employed, or an on-line process is employed but without going through the payment card network and without any connection with the merchant. The payment card network is not modified in some instances, as far as registration. For example, the registrant visit a web site, mails in a form, calls a phone number, checks a box when applying for a product, or the like. The collected information is then entered in a back-end system. One novel aspect here includes the data infrastructure to capture the information, and the linkage between the data infrastructure and the payment mechanism. Some payment card networks (e.g., BANKNET) already have a framework that can be employed in accordance with aspects of the invention to capture the information; part of the additional record piece that will flow through the payment card network during clearing will be captured in a payments database or the like. Data already being captured by the payment card network is modifies to capture the HSA or FSA data; e.g., under the umbrella of transaction data in transaction data warehouse 2062. When someone registers for the program, processes can be provided that sit on top of the transaction data platform, e.g., to digest the information about HSA or FSA spend and take appropriate action with it; e.g., report it to the customer; put it on a statement, etc. See delivery system 907. In order to facilitate the services, capture who is involved in the program, how they prefer to have the data delivered to them, and so on. This information sits on side of the data warehouse 2062 in one or more embodiments so that there is a linkage between the account holder and his or her transaction data.

In one or more embodiments, the payment card network operator creates within the data warehouse an additional entity that stores the registration details and preferences of the users enrolled in the program. In one or more embodiments, this entity has a unique structure and a relationship with the transaction data warehouse. One or more embodiments also modify the records in the transaction data warehouse to contain the HSA or FSA amounts coming in on the transactions.

In some instances, registration is primarily concerned with the cardholders (those persons who have the HSA or FSA accounts). Since aspects of the information relate to tax benefit eligibility, people may desire the pertinent information for many different reasons; e.g., how much to fund HSA or FSA program next year; statements for tax filing and/or to facilitate filings/collection of funds; automated HSA or FSA distributions where the payment card network operator facilitates sending over information re HSA or FSA expenditures; and the like.

In some embodiments, initially, a cardholder goes to a merchant, e.g., a drug store. The drug store has a server or other computer system linked to its terminals, and when items are scanned, the system "knows" whether the items are HSA- or FSA-eligible, and a record is kept. These records are sent to the acquirer of the merchant and then to the payment card network operator (e.g., location 2009) during the clearing process. In at least some cases, there are two parties involved in providing data for the program:

1. the customer who may register or opt-in, for example; in some instances, registration may be automatic for certain products;
2. the drug store or other merchant.

Merchants do not necessarily need to know whether someone is enrolled in the program to track HSA- or FSA-information; however, when handling PII, all applicable data privacy rules should be adhered to, e.g., via opt-in or the like. In at least some instances, an automated system is utilized where the consumer opts in one time at initiation and then the process is automated. In some cases, merchants send the information in (i.e., push the information on every transaction)—note, however, that in other embodiments, the merchant communicates with the payment card network which confirms that the person is enrolled and the information is only sent if the person is enrolled.

In some embodiments, the payment card network operator provides statement information for banks as a differentiator for the bank. Banks may desire to routinely send all customers who have an HSA or FSA a year-end summary telling the customer the total amount of the customer's HSA- or FSA-eligible purchases for that year. Advantageously, in one or more embodiments, a handshake process can be initiated (e.g., during authorization) where the payment network operator indicates that permission has been obtained to collect the information for a given individual, and the merchant only collects the information upon confirmation. For example, during authorization, responsive to receiving an authorization request, the payment network operator checks the database to determine that the customer is enrolled, and transfers an indicator back to the merchant. The merchant then sends the information during the clearing process. In one or more embodiments, the auth request is not modified but the auth request response is modified with an indicator that the customer is enrolled and has consented to sharing data; the data is then shared in the clearing operation.

In one or more embodiments, the merchant catalogs eligible products and integrates reporting into its payment system. On the payment card network side, pertinent aspects include clearing modification, a data structure that houses registration information, and, in some cases, a modified auth request response as just discussed. In some embodiments, registration is facilitated at the point of sale. For example, the computer system of a drug store (or other merchant) recognizes, upon card presentation for checkout, that the cardholder has an eligible card account, and the cardholder is prompted to register for the program. In that case, an additional auth modification can be made in that now the enrollment information is passed from the merchant to the payment card network operator along with the authorization request—the cardholder is prompted during checkout as to whether he or she wishes to enroll. In this embodiment, the auth request is modified.

Registration involves obtaining cardholder consent and optionally preferences as to how and when the cardholder wishes to receive the information. Information may not go to the end user (cardholder) in some instances; it may go to the issuer or third party administrator of HSA or FSA accounts, for example (of course, always in compliance with all applicable data privacy rules, when PII is involved).

Given the discussion thus far, it will be appreciated that, in general terms, an exemplary method, according to an aspect of the invention, includes the step of obtaining, at an intermediate node in a payment card processing network (e.g., central facility 2009 of network 2008), from a merchant 2004 which sells eligible wares which are eligible to be paid for with a special account (e.g., FSA/HSA) and ineligible wares which are not eligible to be paid for with the special account, clearing records for payment card transactions with said merchant. "Wares" are defined herein to include goods and/or services. The clearing records specify, for each of said transactions, a total transaction amount and information representative of an amount associated with said eligible wares. The clearing records can be obtained, for example, by clearing and settlement system 2074 over network 2008 via global file transfer 2059.

A further step includes storing at least a portion of said clearing records in a first database (e.g., 919) accessible to said intermediate node in said payment card processing network, by transaction. This step can be carried out, for example, with a suitable database program such as a relational database management system or a graph database, storing the records in persistent storage. An even further step includes querying said first database on payment card account number and collecting, for said payment card account number, at least said information representative of an amount associated with said eligible wares. This step can be carried out, for example, with the database program, querying the records in persistent storage. An even further step includes making said collected information representative of an amount associated with said eligible wares available to at least one interested party. This step can be carried out, for example, with the delivery system 907.

As noted above, in some instances, said information representative of an amount associated with said eligible wares comprises item-by-item eligibility data. However, in many instances, said information representative of an amount associated with said eligible wares comprises a portion of said total transaction amount which is for said eligible wares. For example, the record for each transaction includes the total amount (say $50.00) and the eligible amount (say $22.50). Of course, it would be possible to include instead the eligible and ineligible amounts, from which the total could be calculated, or the total and ineligible amounts, from which the eligible amount could be calculated.

In one or more embodiments, the collecting is carried out for a predetermined time period. For example, data for eligible expenses for a certain account may be collected monthly, quarterly, for six months, for a whole year, for a particular defined period of interest, and so on. This step can be carried out, for example, with the database program, querying the records in persistent storage, by timestamp as well as account number.

Unlike prior techniques, in at least some embodiments, said method steps are carried out without any communication of said information representative of an amount associated with said eligible wares during a transaction authorization process. Thus, prior techniques have transmitted a total amount and a qualified amount in the authorization request; in contrast, in one or more embodiments, such information is transmitted only during the clearing and settlement process. Some embodiments do not modify the authorization request and authorization request response at all. Some embodiments modify the authorization request and authorization request response to provide a "handshake" aspect as discussed above.

Furthermore regarding the handshake aspect, some instances include obtaining a plurality of standard authorization requests (e.g., ISO 8583 MTI 0100) for said payment card transactions with said merchant; and responding to at least a portion of said plurality of standard authorization requests, for which said opt-in has been obtained, from said intermediate node in said payment card processing network, with a modified authorization request response (e.g. modified ISO 8583 MTI 0110) indicating that said clearing records specifying said total transaction amount and information representative of an amount associated with said eligible wares should be sent to said intermediate node in said payment card processing network. The authorization request response could be modified, for example, by the issuer 2010 or in central facility 2009 of network 2008 by the operator.

In some cases (see above discussion of messages in case of enhanced services), at least a portion of said standard authorization requests are obtained at said intermediate node in said payment card processing network in response to an entry in a member parameter system. For example, as a result of opt-in, the account number or a portion thereof is stored in MPS 2018 and extracted out to MPS extracts 2022, 2044. The auth request is then routed to location 2009.

In some instances, said obtaining step is responsive to an entry in a member parameter system. For example, during auth, a notation is made at the acquirer and/or merchant in response to presence of a particular account number, or a portion of it, in MPS extract 2022; this flags opt-in, and the information representative of an amount associated with said eligible wares is included in the clearing records for that account, based on opt-in. The acquirer could advise the merchant whether to include the information representative of an amount associated with said eligible wares or could delete records for accounts not flagged in the MPS.

One or more embodiments thus address security and privacy challenges that arise in the context of an ISO 8583 network or the like utilized to process transactions which are partially eligible for HSA/FSA reimbursement. One or more embodiments address these concerns by linking an opt-in process to a central member parameter system which is extracted to an interface processor at the premises of an acquirer. In particular, one or more embodiments transmit eligible amounts only upon opt-in, using a special technological mechanism unique to the modern ISO 8583 network. Cardholder opt-in is noted in the MPS 2018 and then information indicative of opt-in (e.g., PAN or a portion thereof) is extracted out to MPS extracts 2022, 2044. Unless the account is flagged to indicate opt-in and present in the MPS extract 2022, eligible amounts are not transmitted from the merchant at all or are transmitted to the physically secure facility of the acquirer and deleted if not flagged in the MPS extract 2022.

Thus, in one or more embodiments, an entry in the MPS extract 2022 on the PNIP 2012 of the acquirer 2006 contains a flag or the like regarding special routing of information. This is useful in a number of contexts; e.g., the aforementioned "handshake." In some instances, it is particularly valuable when the acquirer and issuer are the same party (this is possible even in the four party model when the merchant's acquirer just happens to be the same bank that issued the purchaser's card). In such instances, in conventional processing, a so-called "on us" transaction (from the perspective of the bank) or "off us" transaction (from the perspective of the payment card network) ensues, where the acquirer/issuer bypasses the payment card network. In one or more embodiments, the aforementioned entry in the MPS extract 2022 on the PNIP 2012 of the acquirer 2006 ensures that pertinent info is indeed routed to the payment card network, even when the acquirer and issuer are the same party.

In some cases, when the acquirer (regardless of whether it is the same as or different from the issuer) notes the entry in the MPS extract 2022 on the PNIP 2012 containing a flag or the like regarding special routing of information, the acquirer sends a custom communication back to the merchant 2004 and advises the merchant 2004 to include the eligible item total in the clearing messages; this information is not sent otherwise. In an alternate approach, the information is sent from the merchant to the acquirer in the clearing record but is isolated and deleted by the acquirer (before sending into the payment card network) if there is no flag or the like in the MPS extract 2022 indicating opt-in. The acquirer can communicate back to the merchant in a variety of ways; by way of example and not limitation, inserting additional information in to the ISO 8583 MTI 0110 auth request response.

As noted, the step of making said collected information representative of an amount associated with said eligible wares available to at least one interested party can be carried out, for example, with the delivery system 907—in some cases, making said collected information available to at least one interested party comprises making said collected information available to a payment card issuer 2010—for example, via an application programming interface 917 or via periodically sending a batch file.

In some cases, making said collected information available to at least one interested party comprises making said collected information available to a third party administrator (omitted from drawings to avoid clutter)—for example, via an application programming interface (e.g., 917 or other) or via periodically sending a batch file.

Note that in some instances, issuer 2010 or a third party administrator can in turn make the information available to the cardholder.

On the other hand, in some cases, making said collected information available to at least one interested party comprises making said collected information directly available from an operator of said payment card processing network to an account holder associated with said payment card account number (e.g., HSA/FSA account holder). This step could be carried out, for example, via UI 921, e-mail 909, statements 911, web site 915, or other mechanisms such as are shown in FIG. 10, or the like.

In some cases, a further step includes storing at least said information representative of an amount associated with said eligible wares in a second database. In such case, said collected information representative of an amount associated with said eligible wares is made available to said at least one interested party from said second database. For example, the first database could include transaction data with records of total and eligible amounts per transaction, implemented in database 2054 or data warehouse 2062, while the second database could be database 919 implemented as a stand-alone database, with records limited to HSA/FSA-related amounts by account number and time.

As noted, appropriate privacy protections should be implemented in all cases. Some embodiments utilize an opt-in or opt-out process. For example, in some cases, a further step includes obtaining an indication of opt-in from an account holder associated with said payment card account number, as part of an enrollment process. The obtaining step is then responsive to said opt-in. The opt-in could be flagged, for example, in database 919, member parameter system 2018, and/or MPS extracts 2022, 2044.

Some embodiments further include obtaining account holder preference information as part of an enrollment process. Making the collected information available to at least one interested party then includes making said collected information available to said account holder in accordance with said account holder preference information (e.g., via e-mail monthly, via mailed paper statement quarterly, and so on).

System and Article of Manufacture Details

Embodiments of the disclosure can employ hardware and/or hardware and software aspects. Software includes but is not limited to firmware, resident software, microcode, etc. Software might be employed, for example, in connection with one or more of a terminal 122, 124, 125, 126; a reader 132; a host, server, and/or processing center 140, 142, 144 (optionally with data warehouse 154) of a merchant, issuer, acquirer, processor, bank, agent, third party, or operator of a payment network 2008; and the like. Firmware might be employed, for example, in connection with payment devices such as cards 102, 112, as well as reader 132.

Figure 8:
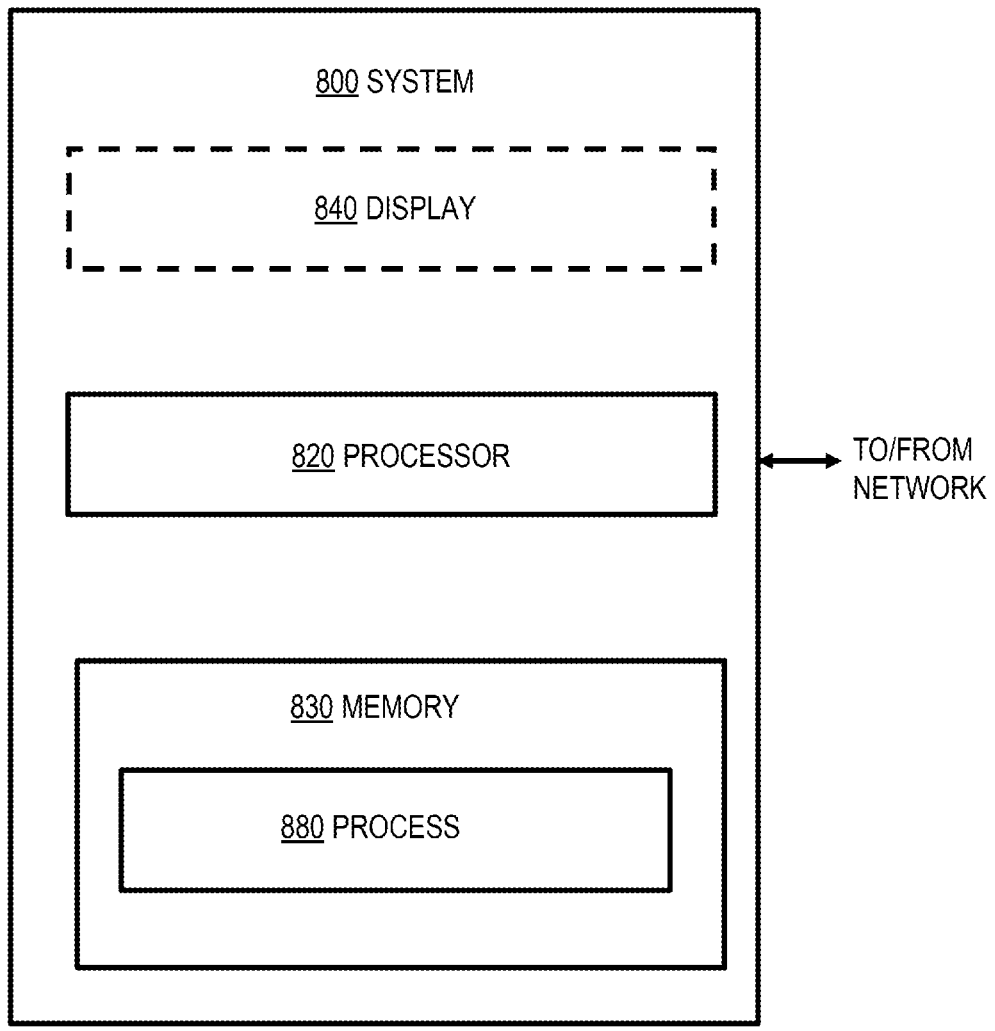
FIG. 8 is a block diagram of an exemplary computer system useful in one or more embodiments of the disclosure.

FIG. 8 is a block diagram of a system 800 that can implement part or all of one or more aspects or processes of the disclosure. As shown in FIG. 8, memory 830 configures the processor 820 (which could correspond, e.g., to processor portions 106, 116, 130; a processor of a terminal or a reader 132; processors of remote hosts in centers 140, 142, 144; processors of hosts and/or servers implementing systems in FIGS. 9 and 10 and their components; processors of hosts and/or servers of other parties described herein; and the like); to implement one or more aspects of the methods, steps, and functions disclosed herein (collectively, shown as process 880 in FIG. 8). Different method steps can be performed by different processors. The memory 830 could be distributed or local and the processor 820 could be distributed or singular. The memory 830 could be implemented as an electrical, magnetic or optical memory, or any combination of these or other types of storage devices (including memory portions as described above with respect to cards 102, 112). It should be noted that if distributed processors are employed, each distributed processor that makes up processor 820 generally contains its own addressable memory space. It should also be noted that some or all of computer system 800 can be incorporated into an application-specific integrated circuit (ASIC) or general-use integrated circuit. For example, one or more method steps could be implemented in hardware in an ASIC or field-programmable gate array (FPGA) rather than using firmware. Display 840 is representative of a variety of possible input/output devices (e.g., displays, printers, keyboards, mice, touch screens, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing systems in FIGS. 9 and 10 and their components; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the disclosure, such as, for example, 122, 124, 125, 126, 140, 142, 144, 2004, 2006, 2008, 2010; a computer implementing systems in FIGS. 9 and 10 and their components; on processors of hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the disclosure can include a computer program comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 8) running a server program. It will be understood that such a physical server may or may not include a display, keyboard, or other input/output components. A "host" includes a physical data processing system (for example, system 800 as shown in FIG. 8) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. Referring again to FIGS. 4 and 10, in one or more embodiments, the modules include clearing and settlement system module 2074, one or more database modules 919, a delivery system module to implement delivery system 907, a GUI module to implement UI 921 when UI 921 is implemented as a GUI; a module or modules with code to implement one or more APIs (e.g., 915, 917, or UI 921 when the same is implemented as an API). The database module can include, for example, a (relational, graphical, or other) database management system (DBMS) which provides access to the database via queries and the like. Sub-modules can be provided to implement functionality 909, 911, and 913. The method steps can, in any event, be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

One example of a user interface module to implement a UI is hypertext markup language (HTML) code served out by a server or the like, to a browser of a computing device of a user. The HTML is parsed by the browser on the user's computing device to create a graphical user interface (GUI).

Thus, aspects of the disclosure can be implemented, for example, by one or more appropriately programmed general purpose computers, such as, for example, servers, mobile devices, or personal computers, located at one or more of the entities in the figures, as well as within the payment network 2008. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 Financial transaction card originated messages—Interchange message specifications and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the disclosure have been described herein with reference to the accompanying drawings, it is to be understood that the disclosure is not limited to those precise embodiments, and that various other changes and modifications may be made by one skilled in the art without departing from the scope or spirit of the disclosure.

What is claimed is:
1. A computer implemented method comprising:
obtaining, by at least one processor, at an intermediate node in a payment card processing network, from a merchant which sells eligible wares which are eligible to be paid for with a special account and ineligible wares which are not eligible to be paid for with a special account, clearing records for payment card transactions with said merchant, said clearing records specifying, for each of said transactions, a total transaction amount and information representative of an amount associated with said eligible wares;
storing, by the at least one processor, at least a portion of said clearing records in a first database accessible to said intermediate node in said payment card processing network, by transaction;
querying, by the at least one processor, said first database on payment card account number and collecting, for said payment card account number, at least said information representative of an amount associated with said eligible wares;
making, by the at least one processor, said collected information representative of an amount associated with said eligible wares available to at least one interested party;

obtaining, by the at least one processor, an indication of opt-in from an account holder associated with said payment card account number, as part of an enrollment process;

obtaining, by the at least one processor, a plurality of standard authorization requests for said payment card transactions with said merchant; and responding, by the at least one processor, to at least a portion of said plurality of standard authorization requests, for which said opt-in has been obtained, from said intermediate node in said payment card processing network, with a modified authorization request response indicating that said clearing records specifying said total transaction amount and information representative of an amount associated with said eligible wares should be sent to said intermediate node in said payment card processing network, wherein said obtaining step is responsive to said opt-in, wherein said information representative of an amount associated with said eligible wares comprises a portion of said total transaction amount which is for said eligible wares, wherein said method steps are carried out without any communication of said information representative of an amount associated with said eligible wares during a transaction authorization process, wherein at least a portion of said standard authorization requests are obtained at said intermediate node in said payment card processing network in response to an entry in a member parameter system, and wherein said obtaining step is responsive to an entry in the member parameter system.

2. The method of claim 1, wherein said information representative of an amount associated with said eligible wares comprises item-by-item eligibility data.

3. The method of claim 1, wherein said collecting is carried out for a predetermined time period.

4. The method of claim 1, wherein making said collected information available to at least one interested party comprises making said collected information available to a payment card issuer via an application programming interface.

5. The method of claim 1, wherein making said collected information available to at least one interested party comprises making said collected information available to a payment card issuer via periodically sending a batch file.

6. The method of claim 1, wherein making said collected information available to at least one interested party comprises making said collected information available to a third party administrator via an application programming interface.

7. The method of claim 1, wherein making said collected information available to at least one interested party comprises making said collected information available to a third party administrator via periodically sending a batch file.

8. The method of claim 1, wherein making said collected information available to at least one interested party comprises making said collected information directly available from an operator of said payment card processing network to an account holder associated with said payment card account number.

9. The method of claim 1, further comprising storing at least said information representative of an amount associated with said eligible wares in a second database, wherein said collected information representative of an amount associated with said eligible wares is made available to said at least one interested party from said second database.

10. The method of claim 1, further comprising obtaining account holder preference information as part of an enrollment process, wherein making said collected information available to at least one interested party comprises making said collected information available to said account holder in accordance with said account holder preference information.

11. A non-transitory computer readable medium comprising computer executable instructions which when executed by a computer cause the computer to perform the method of:

obtaining, by at least one processor, at an intermediate node in a payment card processing network, from a merchant which sells eligible wares which are eligible to be paid for with a special account and ineligible wares which are not eligible to be paid for with a special account, clearing records for payment card transactions with said merchant, said clearing records specifying, for each of said transactions, a total transaction amount and information representative of an amount associated with said eligible wares;

storing, by the at least one processor, at least a portion of said clearing records in a first database accessible to said intermediate node in said payment card processing network, by transaction;

querying, by the at least one processor, said first database on payment card account number and collecting, for said payment card account number, at least said information representative of an amount associated with said eligible wares;

making, by the at least one processor, said collected information representative of an amount associated with said eligible wares available to at least one interested party;

obtaining, by the at least one processor, an indication of opt-in from an account holder associated with said payment card account number, as part of an enrollment process;

obtaining, by the at least one processor, a plurality of standard authorization requests for said payment card transactions with said merchant; and responding, by the at least one processor, to at least a portion of said plurality of standard authorization requests, for which said opt-in has been obtained, from said intermediate node in said payment card processing network, with a modified authorization request response indicating that said clearing records specifying said total transaction amount and information representative of an amount associated with said eligible wares should be sent to said intermediate node in said payment card processing network, wherein said obtaining step is responsive to said opt-in, wherein said information representative of an amount associated with said eligible wares comprises a portion of said total transaction amount which is for said eligible wares, wherein said method steps are carried out without any communication of said information representative of an amount associated with said eligible wares during a transaction authorization process, wherein at least a portion of said standard authorization requests are obtained at said intermediate node in said payment card processing network in response to an entry in a member parameter system, and wherein said obtaining step is responsive to an entry in the member parameter system.

12. An apparatus comprising:
a memory;
at least one processor, coupled to the memory; and a non-transitory computer readable medium comprising computer executable instructions which when loaded into the memory configure the at least one processor to:

obtain, at an intermediate node in a payment card processing network, from a merchant which sells eligible wares which are eligible to be paid for with a special account and ineligible wares which are not eligible to be paid for with a special account, clearing records for payment card transactions with said merchant, said clearing records specifying, for each of said transactions, a total transaction amount and information representative of an amount associated with said eligible wares;

store at least a portion of said clearing records in a first database accessible to said intermediate node in said payment card processing network, by transaction; query said first database on payment card account number and collecting, for said payment card account number, at least said information representative of an amount associated with said eligible wares;

make said collected information representative of an amount associated with said eligible wares available to at least one interested party;

obtain an indication of opt-in from an account holder associated with said payment card account number, as part of an enrollment process;

obtain a plurality of standard authorization requests for said payment card transactions with said merchant; and respond to at least a portion of said plurality of standard authorization requests, for which said opt-in has been obtained, from said intermediate node in said payment card processing network, with a modified authorization request response indicating that said clearing records specifying said total transaction amount and information representative of an amount associated with said eligible wares should be sent to said intermediate node in said payment card processing network, wherein said obtaining step is responsive to said opt-in, wherein said information representative of an amount associated with said eligible wares comprises a portion of said total transaction amount which is for said eligible wares, wherein said method steps are carried out without any communication of said information representative of an amount associated with said eligible wares during a transaction authorization process, wherein at least a portion of said standard authorization requests are obtained at said intermediate node in said payment card processing network in response to an entry in a member parameter system, and wherein said obtaining step is responsive to an entry in the member parameter system.

* * * * *